United States Patent Office 3,457,417
Patented July 22, 1969

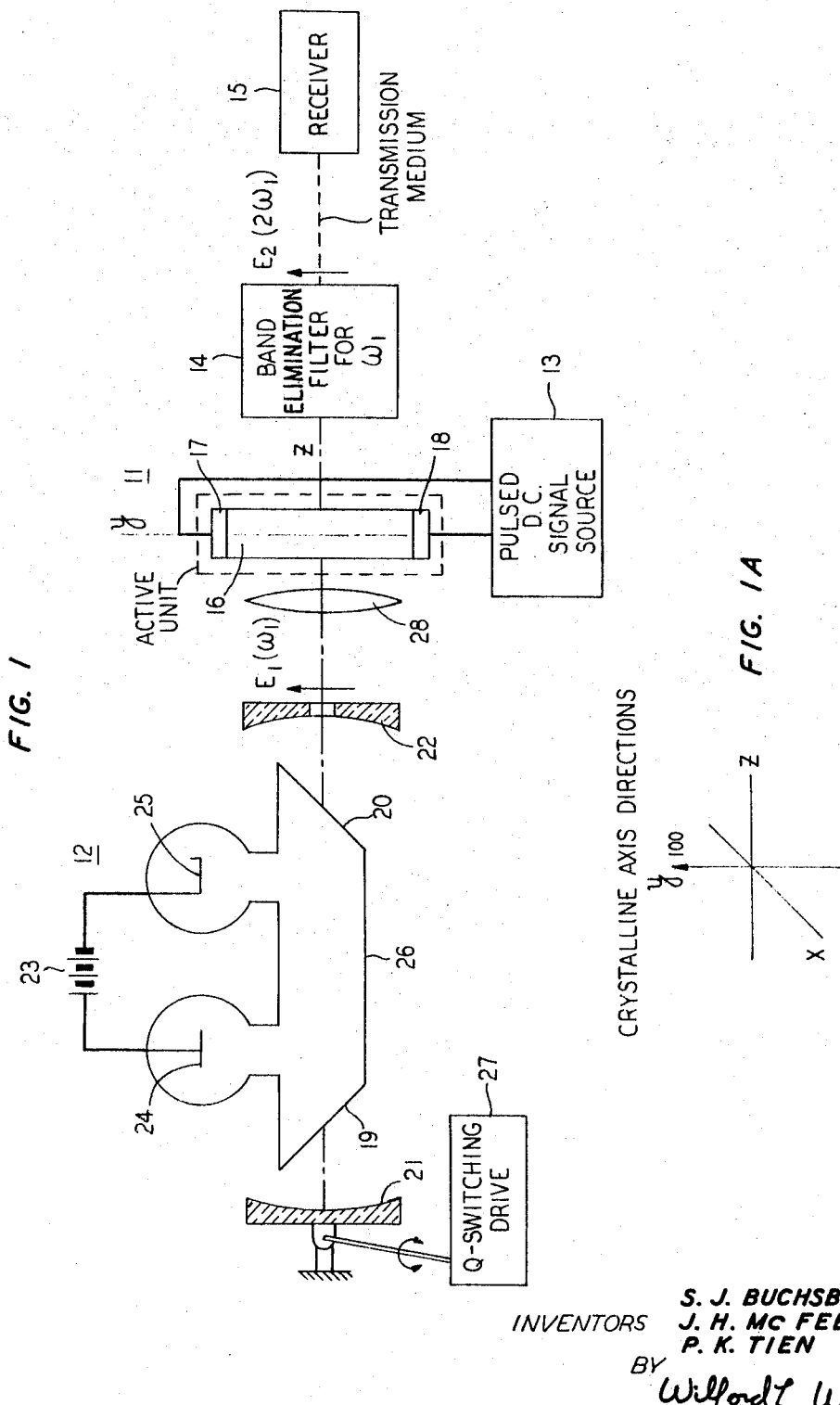

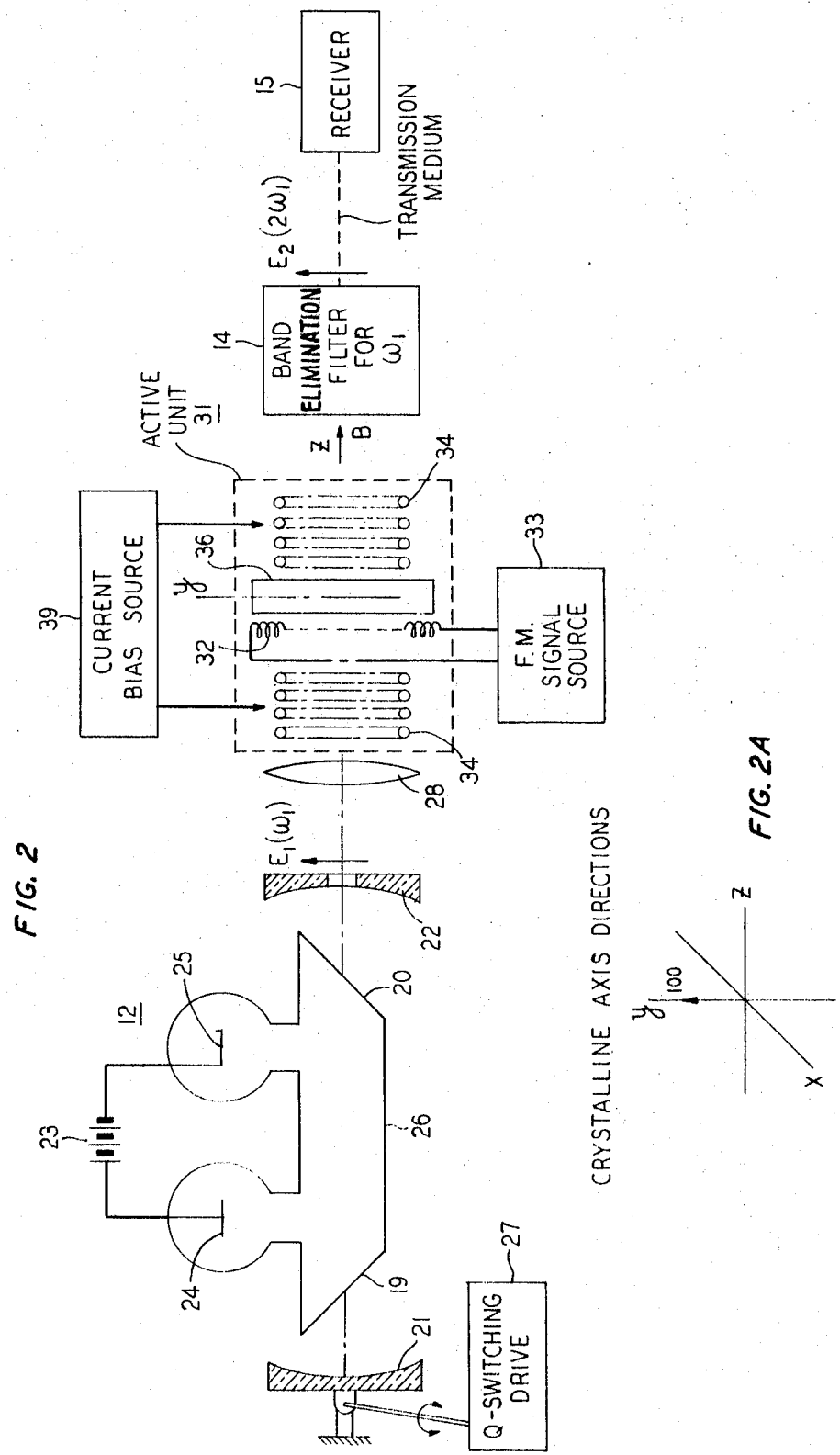

3,457,417
SECOND HARMONIC SEMICONDUCTOR MODU-
LATORS FOR COHERENT RADIATION
Solomon J. Buchsbaum, Westfield, and James H. McFee
and Ping K. Tien, Chatham Township, Morris County,
N.J., assignors to Bell Telephone Laboratories, Incor-
porated, Murray Hill, N.J., a corporation of New York
Filed June 20, 1967, Ser. No. 647,404
Int. Cl. H04b 9/00
U.S. Cl. 250—199   6 Claims

ABSTRACT OF THE DISCLOSURE

Modulators producing a modulated second-harmonic wave that is easily separated from the input fundamental wave make use, in appropriate semiconducting crystals, of the generation of a second harmonic having a power that is proportional to the power of a direct-current electric field, which is applied to the crystal simultaneously with an intense laser beam. In particular, a laser beam at 10.6 microns is used with an indium arsenide crystal to which is applied a modulating direct-current electric field to provide a modulated 5.3 micron beam.

In the case that the modulating signal has frequency components so high that their fields cannot penetrate significantly into the semiconductor, the modulation is impressed on the semiconductor by means of helicon waves.

BACKGROUND OF THE INVENTION

This invention relates to modulation apparatus for beams of coherent optical radiation.

Presently available modulation schemes still leave a lot of room for improvement. For example, electro-optic effects in most materials are so weak that only relatively small degrees of modulation can usually be obtained in an economically feasible way. Multiple-pass electro-optic modulation has been proposed in the copending patent application of R. Kompfner, Ser. No. 631,394, filed Apr. 17, 1967, and assigned to the assignee hereof. Nevertheless, a better signal-to-noise ratio can probably be obtained if the basic modulation effect is stronger than that in such a multiple-pass modulator.

Another widely explored alternative is modulation of the beam of coherent optical radiation in a parametric interaction with a modulated signal wave. Most parametric effects can only be made strong enough to achieve the desired degree of modulation by means of a technique called phase-matching. This technique severely limits the modulating signal frequencies that can be employed to a selected range of optical frequencies or near-optical frequencies.

Moreover, some parametric effects which are most easily phase-matched, such as that disclosed in the copending patent application of P. A. Fleury et al., Ser. No. 589,452, filed Oct. 25, 1966, now Patent No. 3,371,220 and assigned to the assignee hereof, will provide a modulated output beam so close in frequency to the input pumping beam that the two cannot be readily separated. Thus, while such an arrangement has several advantages, it is difficult to achieve an effective modulation index of 100 percent.

SUMMARY OF THE INVENTION

According to our invention, an intense laser beam and a modulated signal field are mixed by a nonlinear interaction in a crystal that has a nonparabolic conduction band and that is substantially transparent to both the laser beam and its second harmonic to produce a modulated second harmonic. A conduction band is nonparabolic when the effective mass of the charge carriers (i.e., mobile electrons) varies significantly, i.e., at least 10 percent, as their momentum is changed. This relationship is the source of the nonlinearities employed in modulators according to our invention.

We have discovered mixing of a Q-switched infrared laser beam and a pulsed direct-current signal in an indium arsenide crystal, which has a nonparabolic conduction band, to produce a second harmonic of the laser frequency. The second harmonic is produced only during coincidence of the laser beam and the direct-current signal and has a power proportional to the power of the direct-current signal. The results indicate that a modulator according to our invention should produce a second-harmonic carrier that can be 100 percent modulated even at very high frequencies.

For modulation frequencies so high that the skin depth in the crystal is less thn the coherence length for the second harmonic, our analysis shows that helicon waves may advantageously be employed to modulate the amplitude of the second harmonic. Suitable helicon waves can be launched by a varying magnetic flux field responsive to the modulating signal in the presence of a static biasing magnetic field in the common direction of propagation of the optical waves.

The second-harmonic frequency is so far removed from the fundamental laser frequency that, even though it is relatively weak, it can be easily separated from the parent beam by use of a prism, grating, interference filter, or other conventional means. Also, since the mobile-carrier nonlinearity employed in practicing our invention is isotropic, the crystal may be oriented to suppress harmonics generated, anisotropically, by the lattice polarization. The suppressed harmonics are typically not signal-responsive.

BRIEF DESCRIPTION OF THE DRAWING

Other features and advantages of the present invention may be apprehended from the following detailed description taken together with the drawing, in which:

FIG. 1 is a partially pictorial and partially block diagrammatic illustration of a first embodment of the invention employing pulsed direct-current signals;

FIG. 1A is a perspective coordinate diagram illustrating the orientation of the crystal in the active unit of FIG. 1;

FIG. 2 is a partially pictorial and partially block diagrammatic illustration of a second embodiment of the invention employing helicon-wave modulating signals; and FIG. 2A is a perspective coordinate diagram illustrating the orientation of the crystal in the active unit of the embodiment of FIG. 2.

DETAILED DESCRIPTION OF ILLUSTRATIVE EMBODIMENTS

The embodiment of FIG. 1 is a simple arrangement for producing a 100 percent modulated coherent second-harmonic output signal powered by the 10.6 micron coherent radiation from a Q-switched high-power carbon dioxide laser, such as that disclosed in the copending patent application of C. K. N. Patel, Ser. No. 495,844, filed Oct. 14, 1965, and assigned to the assignee hereof, with the addition of means for Q-switching the laser to provide a sufficient power level.

In the embodiment of FIG. 1, the active unit 11 is supplied with coherent optical radiation from the Q-switched laser 12 and produces an interaction between that radiation and its mobile charge carriers that is amplitude-modulated by a signal from the pulsed direct-current source 13. The radiation passing through the active unit 11 is then passed through a band-pass filter 14 to remove the remnants of the fundamental radiation, i.e., that radiation originally supplied by laser 12; and the modulated radiation at the second-harmonic frequency is passed by filter 14 into the transmission medium to propagate to the optical communication receiver 15. Thus, the assembly of unit 11, laser 12, source 13 and filter 14 comprises the transmitter of a communication system.

The active unit 11 includes the single crystal 16 of n-type indium arsenide (InAs) having, for example, dimensions as follows: 1 centimeter long in the Y-direction, 2 millimeters wide in the X-direction (out of the paper), and 0.1 millimeter thick in the Z-direction, the direction of propagation of the beam from laser 12. The crystal 16 is cut so that it has a 100 crystalline axis in the Y-direction, parallel to the laser field polarization. (In a cubic crystal such as those of interest here, a 100 crystalline axis is a direction along the edge of the unit cubic structure.) This orientation is used in order to suppress the generation of the second harmonic of the laser beam resulting from crystalline lattice polarization. The dependence of the second harmonic generated by lattice polarization in an indium arsenide crystal upon orientation is discussed in detail in the article by Dr. C. K. N. Patel in Physical Review Letters, 16, at page 613 (1966). The reason that this second harmonic generation must be suppressed is that it is not significantly affected by the direct-current signal; whereas, the second harmonic produced by the mobile carriers is directly proportional to the direct-current power. The indium arsenide crystal 16 typically has a carrier concentration of $1 \times 10^{12}$ per cubic centimeter.

The active unit 11 further includes the electrodes 17 and 18 attached to the crystal 16. The electrodes create an electric field along the same 100 crystalline axis above mentioned, which is also along the long dimension of the crystal. The electrodes 17 and 18 are connected to the output of the pulsed direct-current signal source 13.

The carbon dioxide laser 12 includes a tube 26 having Brewster-angle end faces 19 and 20 and reflectors 21 and 22, which illustratively form a near-confocal resonator. Reflector 21 is rotatably mounted and is driven by the Q-switching drive 27. The tube 26 typically contains a mixture of carbon dioxide, nitrogen and helium and is powered by a direct-current discharge from the direct-current source 23 to the anode 24 and the cathode 25. Preferred arrangements for the laser 12 are found in the above-cited copending patent application of C. K. N. Patel. The reflectors 21 and 22 and the gas pressure are adapted so that the laser produces substantially all its coherent radiation at 10.6 microns. For example, the ratio of partial pressures of helium to nitrogen to carbon dioxide may be 10:2:1. The 10.6 micron radiation is focused upon the crystal 16 by the lens 28.

The band-pass filter 14 is illustratively a germanium substrate interference filter.

The receiver 15 illustratively comprises a photo-detector followed by suitable amplifiers. For example, the photo-detector might be a copper-doped germanium photodetector.

The transmission medium would preferably be a hollow pipe adapted to provide low attenuation of the 5.3 micron second-harmonic radiation.

In one specific experiment with the embodiment just described, except that the transmission medium was a short distance of air, the carbon dioxide laser 12 supplied 5 kilowatts of pulsed 10.6 micron radiation (0.3 microsecond pulse width) polarized in the Y-direction and propagating in the Z-direction toward unit 11. The pulsed direct-current signal source 13 provided pulses of about 100 volts peak, about 2 microseconds width and 0.1 second period. The receiver 15 produced a pulsed output with a like pulse period, about 3 microseconds observed pulse width, and 1–3 millivolts peak, which corresponds to approximately 0.1 milliwatt peak power at 5.3 micron wavelength. The observed pulse width is broader than the laser pulse width because of the slow response of the amplifiers following the detector.

Without wishing to limit our invention, we propose the following explanation for the operation of the embodiment of FIG. 1. The generation of the second harmonic (5.3 microns) of the 10.6 micron fundamental radiation is produced by the interaction of the fundamental radiation with the pulsed direct-current electric field between electrodes 17 and 18 and the mobile electrons in the indium arsenide crystal. The nonlinear interaction is a third-order nonlinear interaction that is dependent upon the nonparabolic nature of the conduction band in indium arsenide or, more specifically, is depedent upon the variation in effective electron mass with variation in momentum. The conduction band shape referred to above is the shape of the curve of charge carrier energy plotted with respect to charge carrier momentum. It would be a perfect parabola if the charge carriers had constant effective mass.

In the third-order interaction, one expects three electric field contributions. Two of these contributions are provided by the electric field $E_1$ ($\omega_1$) of the fundamental radiation and one of the contributions is made by the pulsed direct-current field between electrodes 17 and 18. Although there are other third-order terms in the tensor describing the interaction, the interaction under consideration here is the strongest. The power of the generated second-harmonic field $E_2$ ($2\omega_1$) will be directly proportional to the square of the $E_1$ power and will be directly proportional to the magnitude of the pulsed direct-current power. The pulses detected at receiver 15 are consistent with this analysis.

The signal from source 13 was pulsed in order to facilitate detection at receiver 15 and to reduce heat dissipation in crystal 16; but it should be apparent that the signal from source 13 need not be pulsed but rather could be continuously varying with like effect upon the signal detected at receiver 15.

The band of frequencies present in the signal from source 13, which can be effective in modulating the second harmonic, is determined by the so-called skin effect in the crystal 16. Specifically, the skin depth for a particular modulating frequency must be greater than the coherence length for generation of the second harmonic in order for that frequency to be fully effective in modulating the second harmonic. It is known that the second harmonic (5.3 micron) coherence length in indium arsenide is approximately 60 microns. The embodiment of FIG. 1 may therefore be used for modulating frequencies up to about one kilomegacycle per second.

For frequencies too high to have such a skin depth in crystal 16, 100 percent modulation of the second harmonic may nonetheless be obtained by employing the signal to launch a modulated helicon wave in the crystal 16, as illustrated in the embodiment of FIG. 2. A helicon wave is a circularly polarized electromagnetic wave that propagates in a single-component plasma medium with parameters such that $\omega < \omega_c$ and $\omega_c \tau \gg 1$, where $\omega$ is the frequency of the helicon wave, $$\omega_c = \frac{eB}{m^*}$$

is the cyclotron frequency of mobile carriers in the medium, B is the biasing magnetic field, and $\tau$ is the carrier momentum relaxation time. A one-component plasma is a plasma having only one significant type of charge carrier present.

In the embodiment of FIG. 2, the laser 12 is identical to the laser 12 of FIG. 1; and the band elimination filter 14 and receiver 15 are like those of FIG. 1. The active unit 31 differs from the active unit 11 of FIG. 1 as follows: the crystal 36 has no electrodes attached thereto but is otherwise identical to crystal 16 of FIG. 1 and is also oriented identically thereto, as illustrated in the perspective coordinate diagram of FIG. 2A. Accordingly, the orientation is effective to suppress the generation of the second harmonic due to lattice polarization. The unit 31 includes the signal field coil 32, disposed on the side of crystal 36 nearest laser 12 but separated into two parts so as not to block the laser beam. The field coil 32 is oriented to provide a varying magnetic flux along the Y-direction in crystal 36 in response to a frequency-modulated signal from an external source 33. The active unit 31 further includes second field coil 34 oriented to provide a static magnetic biasing field along the Z-direction in the crystal 36. The field coil 34 is separated into two portions as a convenience in arranging crystal 36 and field coil 32; and the two portions of coil 34 are disposed on opposite sides of the crystal 36 in the Z-direction. The coil 34 is energized from a current bias source 39 in a conventional manner.

The modulated current signal from source 33 illustratively includes frequencies from zero to a frequency $\omega_3$, for which frequency the skin depth in crystal 36 is substantially less than the coherence length for the generation of the second harmonic $2\omega_1$. The static magnetic field bias provided by the coil 34 enables the launching of the helicon wave in crystal 36 in response to the time varying flux supplied in the crystal 36 by field coil 32.

In FIG. 2, the power of the generated second harmonic will be proportional to the power of the helicon wave. Consider, for example, that the helicon wave is frequency-modulated; that is, the frequency of the helicon wave varies according to the signal to be transmitted. But, at one instant, the helicon wave has a frequency, $\omega_m$. Now, since the second harmonic generated will be 100 percent frequency-modulated by the helicon wave, approximately all the power of the second harmonic power will be contained in sidebands at frequency $2\omega_1 \pm \omega_m$ (where $\omega_1$ is the laser frequency). These sidebands are the information-bearing part of the second harmonic. We consider that information is preferably impressed on the second harmonic by frequency-modulation of the helicon wave which is launched in response to the signal from source 33.

Various extensions of the principles of the embodiments of FIGS. 1 and 2 should be apparent. The proposed theory for the operation of the invention suggests that lead telluride (PbTe) or bismuth (Bi) can be substituted in the embodiments of FIG. 1 or FIG. 2. In general, other materials having a nonparabolic conduction band could be used to the extent that they have band gaps greater than the energy of the generated second harmonic photons. P-type materials having nonparabolic conduction bands and subjected to uniaxial stress might also be substituted, in which case the mobile charge carriers involved in the interaction would be holes instead of electrons. It is noted that the threshold for the interaction will vary somewhat from material to material and that another laser of suitable frequency could be substituted for the laser 12 provided that the laser is capable of supplying power exceeding the threshold of the isotropic nonlinear interaction for the particular material.

It should be noted that the embodiments above described could be modified to generate substantial modulated beams at frequencies other than the second harmonic frequency as a result of related isotropic nonlinear effects; but these modulated beams would either be weaker than the second harmonic or would be more difficult to separate from the fundamental optical beam supplied by the laser 12.

What is claimed is:

1. Modulation apparatus for coherent radiation, comprising:
   a crystal of material having a nonparabolic conduction band,
   means for supplying coherent radiation into said crystal of frequency $\omega_1$ to which said crystal is substantially transparent, said supplying means providing a polarization of said radiation with respect to the crystalline axes of said crystal to suppress generation of the second harmonic $2\omega_1$ due to lattice polarization, whereby generation of the second harmonic occurs predominantly in an isotropic interaction involving mobile carriers in said conduction band,
   means for applying an amplitude-modulated signal to said crystal to modulate the amplitude of said second harmonic, and
   means for deriving for utilization selectively the amplitude-modulated second-harmonic beam.

2. Modulation apparatus according to claim 1 in which the means for applying an amplitude-modulated signal to the crystal comprises:
   means for applying a modulated direct-current voltage to said crystal to create an electric field orthogonal to the direction of propagation of the field of frequency $\omega_1$.

3. Modulation apparatus according to claim 1 in which the means for applying an amplitude-modulated signal to the crystal comprises:
   means responsive to a modulated signal for injecting a frequency-modulated helicon wave into said crystal to modulate the amplitude of the second harmonic.

4. Modulation apparatus according to claim 3 in which the means for injecting the modulated helicon wave into the crystal comprises:
   a field coil connected to the source of the modulated current signal and oriented to apply a modulated flux field to said crystal in a direction orthogonal to the direction of propagation of the field of frequency $\omega_1$ and
   means for applying a static magnetic field bias to said crystal parallel to the direction of propagation of the field of frequency $\omega_1$.

5. Modulation apparatus according to claim 1 in which the crystal is a crystal of a material having a nonparabolic conduction band and a band gap energy greater than energy of the second-harmonic photons,
   the means for supplying coherent radiation of frequency $\omega_1$ comprises a carbon dioxide laser adapted to operate at a wavelength of approximately 10.6 microns, said supplying means being adapted for propagating said radiation into said crystal and providing a polarization of said radiation along a 100 axis in said crystal, and in which
   the means for applying an amplitude-modulated signal to the crystal comprises
      a source of a plused direct-current signal and
      electrodes adapted to couple said source to said crystal and oriented to create an electric field along said 100 axis.

6. Modulation apparatus according to claim 1 in which the crystal is a crystal of a material having a nonparabolic conduction band and a band gap energy greater than the energy of the second harmonic photons,
   the means for supplying coherent radiation of frequency $\omega_1$ comprises a carbon dioxide laser adapted to operate at a wavelength of approximately 10.6 microns, said supplying means being adapted for propagating said radiation into said crystal and providing a polarization of said radiation along a 100 axis in said crystal, and in which
   the means for supplying an amplitude-modulated signal to the crystal comprises
      a source of a frequency-modulated signal,
      a first field coil connected to the source of the frequency-modulated signal and oriented to apply a modulated flux field to said crystal along said 100 axis and a second field coil adapted and oriented to apply a static magnetic field parallel to the direction of the laser beam with a strength sufficient to enable said first field coil to launch a modulated helicon wave in said crystal.

References Cited

J. P. van der Ziel, Applied Physics Letters, Electro-Optic Amplitude Modulation of Laser-Generated Second Harmonics in KDP.

ROBERT L. GRIFFIN, Primary Examiner

A. J. MAYER, Assistant Examiner

U.S. Cl. X.R.

307—88.3; 331—94.5; 332—7.51